United States Patent [19]

Eitzinger et al.

[11] Patent Number: 4,863,007
[45] Date of Patent: Sep. 5, 1989

[54] ORIENTER FOR CUP-SHAPED OBJECTS

[75] Inventors: Robert Eitzinger; Mark Bidus, both of Long Grove, Ill.

[73] Assignee: Mid-West Automation Systems, Inc., Buffalo Grove, Ill.

[21] Appl. No.: 190,127

[22] Filed: May 4, 1988

[51] Int. Cl.⁴ ............................................. B65G 47/24
[52] U.S. Cl. ................................... 198/399; 198/388; 209/688; 209/928
[58] Field of Search ............... 198/388, 395, 398, 399, 198/400; 209/651, 688, 928, 940

[56] References Cited

U.S. PATENT DOCUMENTS

| | | | |
|---|---|---|---|
| 2,584,526 | 2/1952 | Albertoli | 198/399 |
| 2,843,254 | 7/1958 | Vaughan . | |
| 3,221,857 | 12/1965 | Keller . | |
| 3,311,218 | 3/1967 | Lederer . | |
| 3,451,524 | 6/1969 | Normandin . | |
| 3,633,742 | 1/1972 | Melton . | |
| 3,682,292 | 8/1972 | Drew | 198/399 |
| 3,724,655 | 4/1973 | Clark . | |
| 3,782,526 | 1/1974 | Simons . | |
| 3,791,521 | 2/1974 | Kinney . | |
| 3,856,665 | 12/1974 | Wahlert . | |
| 4,081,069 | 3/1978 | Ono . | |
| 4,111,295 | 9/1978 | Rutherford | 198/399 |
| 4,281,758 | 8/1981 | Adamski . | |
| 4,699,261 | 10/1987 | Nesin . | |

Primary Examiner—Robert J. Spar
Assistant Examiner—Lyle K. Kimms
Attorney, Agent, or Firm—Laff, Whitesel, Conte & Saret

[57] ABSTRACT

A bottle cap orienter has two rotating pin sorters, one positioned above and the other below a path over which randomly oriented bottle caps must travel. A stationary cam adjacent each sorter causes a plurality of pins at selected locations to project into the area of the path through which the bottle caps must travel. Thus, the projecting pins enter the cavity of the caps from above and below so that the caps are captured to rotate with the pin sorters. At one point in the rotation, the pins are withdrawn so that the caps are released to travel under their own inertia over a tangential path. The caps released by one of the pin sorters are inverted, so that all caps are ultimately oriented the same.

12 Claims, 2 Drawing Sheets

ORIENTER FOR CUP-SHAPED OBJECTS

This invention relates to means for orienting somewhat cup-shaped objects such as bottle caps, for example, and more particularly to orienters which are less expensive and more wear resistant than comparable machines that have been used for similar purposes in the past.

There are many different types of objects which may be oriented by the inventive machine. Therefore, for convenience of expression, the following specification will refer to all such objects as "bottle caps". However, this term should be construed broadly enough to cover all suitable objects.

Most orienting means depend upon providing a pathway over which an object must travel as it moves from a bin to an output work station. The pathway usually has a floor or sidewalls shaped to support properly oriented objects, but not to support improperly oriented objects. Thus, any improperly oriented object falls off the path, and usually into an underlying bin. Properly oriented objects do not fall off the path and, therefore, reach a work station at the distant end of the path.

If the object can only face in two directions, as when a cap may only be bottom or top up, it is reasonable to believe that 50% of the caps will fall off the path and 50% will be delivered to the output work station at the distant end. This inherently means that at the very best, the transport mechanism is being used at only a 50% efficiency. The objects which fall into the bin are usually recycled and returned into the transport path a second time, where it again has a 50-50 chance of falling off the path. Statistically, it would appear that at least some of the objects may recycle so many times that they might become worn or defective as a result of the repeated tumbling during the orienting process.

Accordingly, an object of the invention is to provide new and improved means for and methods of orienting somewhat cup-shaped objects, such as bottle caps. Here, an object is to transport virtually all such objects from a storage bin to an output work station without having to recycle and retransport disoriented objects.

Another object of the invention is to provide a wear resistant orienter which does not itself wear out quickly or risk damage to the objects.

In keeping with an aspect of the invention, these and other objects are accomplished by feeding the somewhat cup-shaped objects, such as bottle caps, over a conveyor path. As it so travels, the bottle caps encounter pins which project downwardly from the top and upwardly from the bottom of the path. If the cap is lying on its top, the cavity of the cup-shaped object opens upwardly so that a downwardly facing pin fits into the cavity and flings it outwardly and into a receiving tray, open side up. If the cavity of the cup opens downwardly, an upwardly facing pin fits into the cavity and flings it outwardly and into an inverting channel. As the cap laying on its open side travels through the inverting channel, it comes to rest in the receiving tray with its cavity in the open side up orientation, which is the same as the ending orientation of the cap that was initially lying on its top. Thus, virtually every cap reaches the tray at the output work station, with only a single pass through the transport path.

A preferred embodiment of the invention is shown in the attached drawing wherein:

FIG. 1 schematically shows an orienting machine incorporating the principles of the invention;

Figure 1:
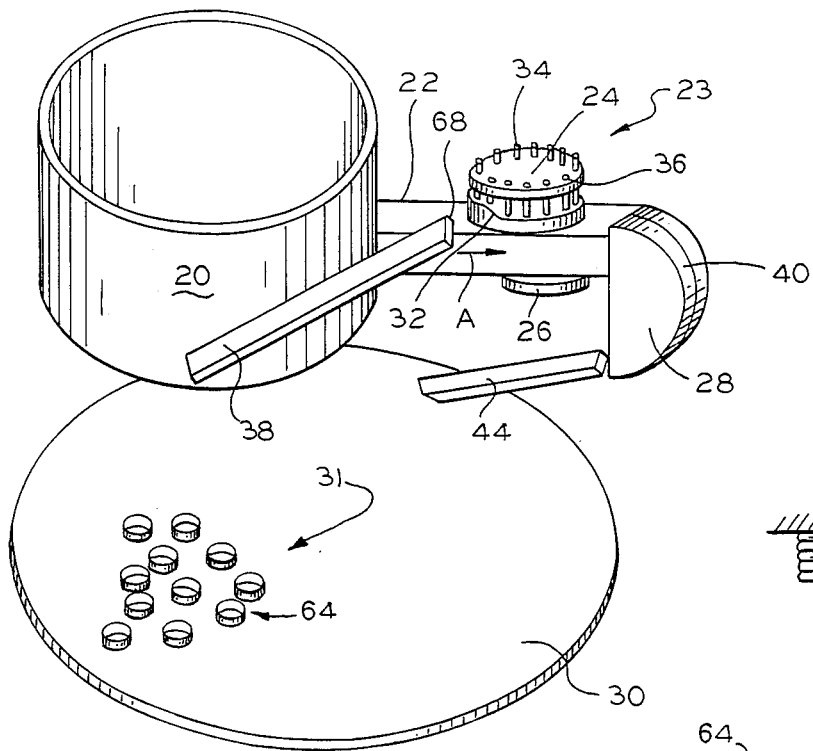

The inventive orienter machine is schematically shown in FIG. 1 as including a magazine or bin 20, a transport path 22, detector or discriminator means 23 in the form of an upper pin sorter 24 and a lower pin sorter 26, an inverter channel 28, and an output location or work station represented by a receiving surface or tray 30. The bottle caps 31 may originate anyplace and may arrive at bin 20 in any suitable manner. For example, a workman may simply dump a bucket full of bottle caps into the top of bin 20.

The nature of the bottle caps is totally irrelevant. For present purposes, they might be thought of as plastic caps about an inch or two in diameter and perhaps a half inch tall.

When the caps are dumped into the bin 20, they may fall with any random orientation. As they work their way into the transport path 22, gravity causes them to lie on one of their flat sides, with the open cavity of the cup facing either upwardly or downwardly. Any suitable conveyor means causes the caps to travel through the transport path 22, in direction A. During this travel, the upper and lower pin sorters 24, 26 discriminate between caps lying open side up and open side down.

The caps first pass under pin sorter 24, which rotates continuously. As pin sorter 24 turns, a stationary cam surface 32 causes pins which are circumferentially located on the sorter to move up and down at selected arcuate locations along the path. For example, pin 34 is here shown in the "up" position and pin 36 is here shown in the "down" position If a bottle cap in transport path 22 is lying with the open side of its cavity up, a lowered pin (such as 36) enters the open side of the cavity. The turning of pin sorter 24 carries the cap around an arcuate path. As cam 32 raises the pin, the inertia of the cap flings it into chute 38. If the cap is lying open side down, the lowered pin cannot enter the cavity in the cap; therefore, the cap passes under pin sorter 24.

Next, the caps pass over lower pin sorter 26 which operates the same as the upper pin sorter 24 operates. If the cavity in the cap opens downwardly, a pin from lower sorter 26 raises, enters the cavity, and carries the cap which, by its inertia, is flung through side 40 of an inverting channel 28. As the cap moves through channel 28, it is turned over and is discharged through chute 44 and onto the surface of tray 30 at the output location or work station. In this manner, all caps are sorted and correctly oriented in a single pass or cycle through the sorters.

Once the caps are deposited on the surface or tray 30 in the output location or work station, it is totally irrelevant what is done with them, insofar as the invention is concerned. It may be assumed that a machine automatically picks them up and spins them on to the top of a medicine bottle, for example.

Figure 4A:
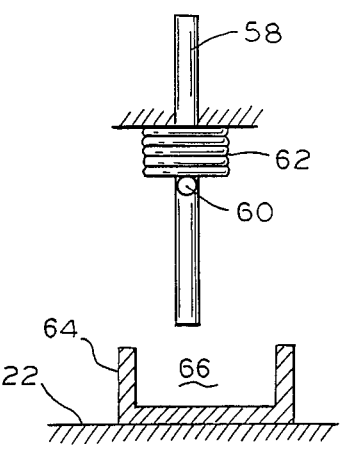
FIG. 4A shows an elevated pin with a bottle cap passing under it.
Figure 2:
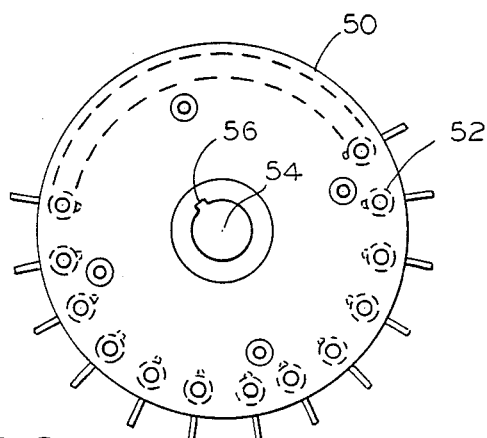
FIG. 2 is a top view of a pin sorter which may be used to separate caps according to their orientation.
Figure 4B:
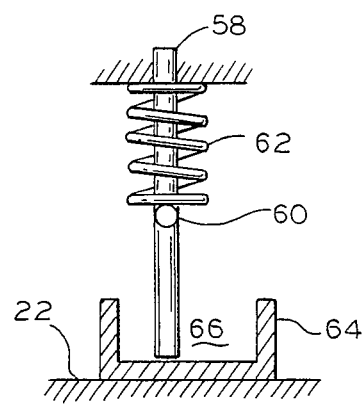
FIG. 4B shows a lowered pin which has entered the open side of the cavity in a bottle cap.
Figure 3:
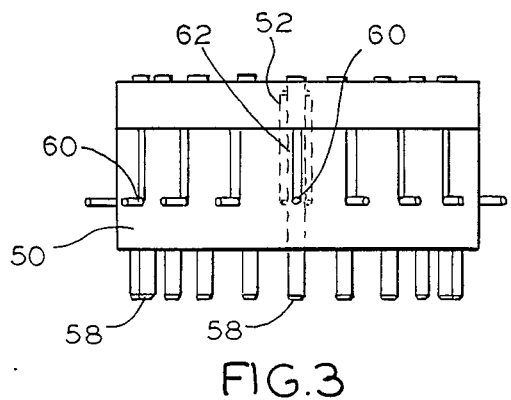
FIG. 3 is a side elevation of the pin sorter of FIG. 2.

The details of the pin sorters 24, 26 are shown in FIGS. 2, 3, 4. A dial or cylindrically-shaped box 50 is made with a plurality of holes (such as 52) which are equally spaced around a circumference of the cylindrical box. Each hole extends through the box and in a direction which is spaced parallel to the axis of rotation 54 of the cylinder 50. A hole at the axis 54 of the cylinder 50 is fitted over a revolving shaft (not shown in FIG. 1) to which it is keyed at 56. Thus, the cylinder 50 rotates with the shaft. A pin 58 is slideably mounted for axial movement within each of the holes 52. Extending perpendicularly outwardly from and integrally with each pin 58 is a projection 60 which rides upon an individually associated coiled spring 62 that is in the hole 52 and is co-axial with the pin.

Thus, each coiled spring 62 pushes the projection 60 downwardly (as viewed in FIGS. 3, 4B) to axially lower the pins 58.

As the cylindrical box 50 turns about its axis 54, the projections 60 ride upon a stationary cam represented at 32 in FIG. 1. During an arcuate part of each revolution, cam 32 pushes the pins 58 into the elevated position (FIG. 4A) against the urging of its individually associated coiled spring 62. In this position, the pins pass over all bottle caps 64 on the transport path 22, regardless of which side is up.

During another arcuate part of each revolution, the cam 32 acts upon the projection 60 to release the pin 58 (FIG. 4B), which moves downwardly responsive to the urging of the associated spring 62. As the lower end of pin 58 moves downwardly (as viewed in FIG. 4B), it enters the cavity 66 of an upwardly directed bottle cap 64.

The rotating cylinder 50 causes the lowered pin 58 to move along a circular path and to carry the bottle cap 64 around a given path which corresponds to that circular path. When cam 32 again engages the projection 60, pin 58 raises to the elevated position seen in FIG. 4A. This lifts the bottom of pin 58 out of cavity 66 in the bottle cap, thereby releasing it so that its inertia flings it tangentially away from the circular path which it had been following. In FIG. 1, the entrance 68 of the chute 38 is on this tangential path so that the bottle cap of FIG. 4B travels down chute 38 after the pin 58 raises (FIG. 4A) to release the cap.

The pin sorter 26 is the same as the pin sorter 24, except that it is inverted. Therefore, the caps which it picks up are those with the cavity openings facing downwardly (i.e. inverted from the position shown in FIGS. 4A, 4B). When the pins are retracted, the caps travel tangentially into the inverting channel 28.

Figure 5:
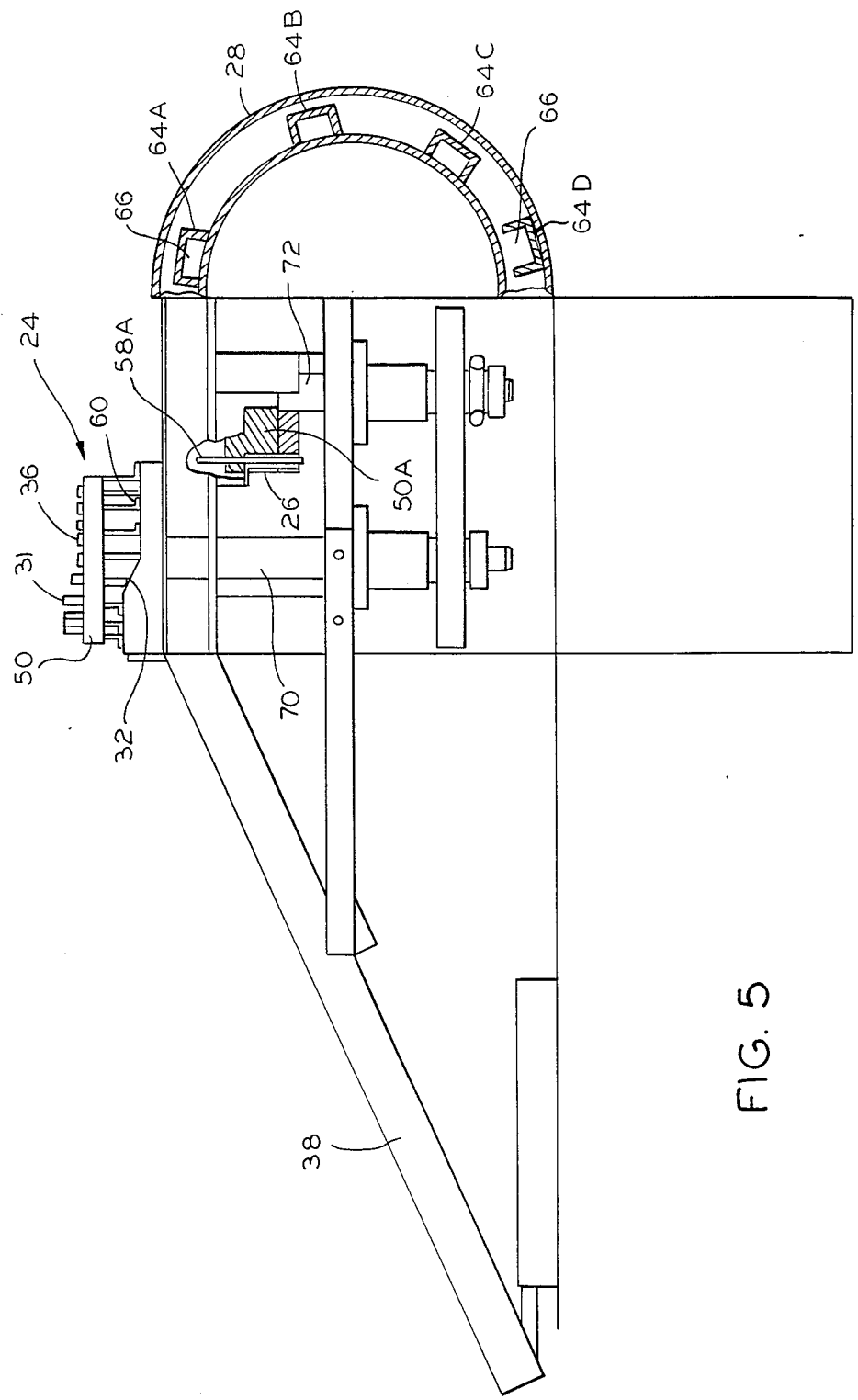
FIG. 5 is a side elevation of the inventive machine.

A side elevation (partly in cross section) is seen in FIG. 5, where the same reference numerals are used to identify the various parts. The drawing is broken away to show pin 58A in the lower pin sorter 26. The inverting channel 28 is also broken away to show how the bottle cap 64 passes through positions 64A, B, C, D as it is inverted from the cavity 66 opening facing downwardly to a cavity opening facing upwardly position. FIG. 5 also shows the revolving shafts 70, 72 which turn the upper and lower cylindrical boxes 50, 50A.

Those who are skilled in the art will readily perceive how modifications may be made within the scope and spirit of the invention. Therefore, the appended claims should be construed to cover all equivalent structures.

The invention claimed is:

1. An orienter for cup-shaped objects, said orienter comprising:
   a source of objects in random orientation;
   transport means for moving said objects toward an output location, gravity causing said objects to lay in either of two positions while being moved by said transport means;
   upper and lower detecting means located at positions along said transport means for discriminating between the objects which are lying in said two positions, said detecting means including a set of downwardly and a set of upwardly directed pins which are axially moved to enter openings leading into the cavities of said cup-shaped objects, said pins moving along a given path to propel the cup-shaped objects along a given path corresponding to the path followed by the pins, and means for moving said pins out of said cavities while said objects are being propelled, whereby said objects continue to travel from said detecting means;
   means responsive to said detecting means for sending the objects lying in one of said two positions directly to said output location; and
   means also responsive to said detecting means for inverting the objects lying in the other of said two positions before sending them to said output location.

2. An orienter for cup-shaped objects, said orienter comprising:
   a source of objects in random orientation;
   transport means for moving said object towards an output location, gravity causing said objects to lay in either of two positions while being moved by said transport means;
   upper and lower detecting means located at positions along said transport means for discriminating between the objects which are lying in said two positions, each of said detecting means including a cylindrical box mounted to turn about its center axis, a plurality of pins circumferentially positioned and axially movable responsive to the turning of said cylindrical box, cam means for moving said pins in said axial direction during the turning of said box, said cam enabling a downward movement of said pins throughout a first arcuate segment in the rotation of said cylindrical box, and an upward movement of said pins throughout a second arcuate segment in the rotation of said cylindrical box, said movement of said pins sending said objects over a path which is tangential to said circumferential positions of said pins;
   means responsive to said detecting means for sending the objects lying in one of said two positions directly to said output location; and
   means also responsive to said detecting means for intervening the objects lying in the other of said two positions before sending them to said output locations.

3. The orienter of claim 2 and means for spring biasing said pins to normally move axially to one position, said cam means controlling the pin location throughout a turning of said cylindrical box, said cam means releasing said pins to return to their normal positions under the urging of said spring bias.

4. A pin sorter for discriminating between two positions of cup-shaped objects, said two positions being with a cavity in said cup-shaped objects facing upwardly and downwardly, respectively, said sorter comprising support means for slidably supporting said pins in a plurality of spaced parallel positions, means for axially sliding said pins back and forth between two axial positions, means for rotating said support means over a given path, means for axially sliding said pins to a first of said positions during a motion of said support means over a first portion of said given path, said pins in said first position projecting far enough to enter said cavity in said cup-shaped objects, and means for axially sliding said pins to a second of said positions during the remainder of said support means motion over said given path, said pins in said second position being retracted from said cavity, whereby said cup-shaped object is propelled by movement of said support means while said pin is in said first position and by its own inertia when said pin is moved to said second position.

5. The pin sorter of claim 4 wherein said given path is at least part of a circular arc and said movement under inertia is over a path which is tangential to said circular arc.

6. The pin sorter of claim 5 and stationary cam means adjacent said support means for selectively moving said pins between said two axial positions as a function of the movement of said support means.

7. The pin sorter of claim 4 and stationary cam means adjacent said support means for selectively moving said pins between said two axial positions as a function of the movement of said support means.

8. The pin sorter of claim 4 wherein there are two of said pin sorters, means for transporting said cup-shaped objects between said two pin sorters, said pins in one of said pin sorters entering said cavity from above and said pins in the other of said pin sorters entering said cavity from below, the inertia of the cup-shaped objects causing them to travel along one path when they are released by one of said pin sorters and to travel along another path when they are released by the other pin sorter.

9. The pin sorter of claim 8 and means positioned along one of said paths for inverting objects traveling along that path, whereby substantially all of said objects have the same orientation at the end of their travel.

10. The pin sorter of claim 9 wherein said inverting means comprises a semi-circular chute through which objects traveling along said one path must pass.

11. The pin sorter of claim 10 wherein said objects are bottle caps.

12. An orienter for uniformly arranging the orientation of cup-shaped objects supplied along a path from an object source, comprising:

a first sorter and a second sorter, each sorter mounted to turn about its center axis and in communication with and on either side of said object path;

a plurality of spring-biased pins circumferentially positioned around each of said sorters, said pins axially movable in and out of the object path in response to the turning of said sorters so as to engage only those cup-shaped objects whose cavities face the pins and to forward them along the object path;

a cam affixed to each sorter for axially moving the pins in and out of the object path; and an inverter in communication with said second sorter for receiving and inverting the position of cup-shaped objects forwarded by the second sorter, so that substantially all of cup-shaped objects are ultimately oriented the same way.

* * * * *